(12) United States Patent
Singh et al.

(10) Patent No.: US 11,186,196 B2
(45) Date of Patent: Nov. 30, 2021

(54) MANAGING THE PROVISIONING OF ELECTRICITY FOR AN ELECTRIC VEHICLE

(71) Applicant: International Business Machines Corporation, Armonk, NY (US)

(72) Inventors: Deependra Kumar Singh, Noida (IN); Abhay Patra, Pune (IN); Harish Bharti, Pune (IN); Rajesh Kumar Saxena, Mumbai (IN)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 16/185,279

(22) Filed: Nov. 9, 2018

(65) Prior Publication Data

US 2020/0148071 A1 May 14, 2020

(51) Int. Cl.
| | | |
|---|---|---|
| *H02J 7/00* | (2006.01) | |
| *B60L 53/66* | (2019.01) | |
| *G06Q 50/06* | (2012.01) | |
| *G06Q 20/14* | (2012.01) | |
| *G06Q 30/04* | (2012.01) | |
| *B60L 53/14* | (2019.01) | |
| *B60L 53/65* | (2019.01) | |

(52) U.S. Cl.
CPC ............ *B60L 53/665* (2019.02); *B60L 53/14* (2019.02); *B60L 53/65* (2019.02); *G06Q 20/145* (2013.01); *G06Q 30/04* (2013.01); *G06Q 50/06* (2013.01)

(58) Field of Classification Search
CPC .................................................. B60L 53/665

USPC ......................................................... 320/109
See application file for complete search history.

(56) References Cited

U.S. PATENT DOCUMENTS

| | | | |
|---|---|---|---|
| 2010/0141203 A1* | 6/2010 | Graziano .............. | B60L 53/305 320/109 |
| 2012/0011058 A1* | 1/2012 | Pitroda .............. | G06Q 20/3227 705/39 |
| 2012/0239571 A1* | 9/2012 | Boot ...................... | B60L 53/14 705/44 |
| 2013/0038424 A1* | 2/2013 | Katar .................. | H02J 13/0062 340/5.8 |
| 2014/0266004 A1* | 9/2014 | Andrews, Jr. ........... | B60L 50/40 320/104 |

(Continued)

OTHER PUBLICATIONS

Suli et al.; Consensus-Based Coordination of Electric vehicle charging; scienceDirect; www.sciencedirect.com. (Year: 2017).*

(Continued)

*Primary Examiner* — Yalkew Fantu
(74) *Attorney, Agent, or Firm* — Schmeiser, Olsen & Watts, LLP; William Hartwell (57) ABSTRACT

A system and method for managing the provisioning of electricity to an electric vehicle includes identifying an electric vehicle when the electric vehicle connects to a charging point; determining whether the electric vehicle is associated with a smart contract; validating the smart contract associated with the electric vehicle; creating a charging transaction for charging the electric vehicle; and applying the smart contract associated with the electric vehicle against the charging transaction. The electric vehicle electricity contract management system and method may use a consensus system such as a distributed ledger system or blockchain.

20 Claims, 8 Drawing Sheets

(56) References Cited

U.S. PATENT DOCUMENTS

2015/0183333 A1\* 7/2015 Forbes, Jr. ............ B60L 53/665
705/5

OTHER PUBLICATIONS

Mell, Peter et al.; "The NIST Definition of Cloud Computing;" National Institute of Standards and Technology; Special Publication 800-145; Sep. 2011; 7 pages.
Ian Allison, RWE and Slock.it—Electric cars using Ethereum wallets can recharge by induction at traffic lights, Updated Feb. 22, 2016, retrieved from internet on May 28, 2021; https://www.ibtimes.co.uk/rwe-slock-it-electric-cars-using-ethereum-wallets-can-recharge-by-induction-traffic-lights-1545220; 4 pages.

\* cited by examiner

MANAGING THE PROVISIONING OF ELECTRICITY FOR AN ELECTRIC VEHICLE

TECHNICAL FIELD

The present invention relates to systems and methods for managing the provisioning of electricity to an electric vehicle, and more specifically to embodiments of systems and methods for delivering automated and seamless charging of a Plug-In Electric Vehicle (PEV) at one of a plurality of charging points through the use of an electric vehicle electricity contract. The electric vehicle electricity management systems and methods make use of a consensus system such as a distributed ledger and/or blockchain.

BACKGROUND

Electric vehicles (such as PEVs) offer a new revenue stream for utility suppliers; however, they also create operational challenges. For example, consumers expect secure, transparent, and seamless payment options at charging points; however, existing systems and methods either fail to meet the consumers' expectations or are unduly expensive for the utility suppliers.

SUMMARY

An embodiment of the present invention relates to a method, and associated computer system and computer program product, for charging an electric vehicle. A processor identifies an electric vehicle when the electric vehicle connects to a charging point and determines whether the electric vehicle is associated with a smart contract. The processor validates the smart contract associated with the electric vehicle and creates a charging transaction for charging the electric vehicle. The processor then applies the smart contract against the charging transaction.

DETAILED DESCRIPTION

In general, personal energy management is a critical and growing segment of the energy industry. Personal energy management includes home energy management, particularly energy management of "smart" devices, i.e., devices and sensors that are connected to each other, to various networks, to service providers, to back-end systems, and/or to the Internet. More specifically, the increase of electric vehicles, particularly PEVs, may greatly affect energy management and add new dimensions to smart meter and smart grid control and management strategy for energy suppliers. Further, electric vehicles offer new markets for suppliers and provide opportunities to cross-sell energy services to existing customers as well as opportunities to acquire new customers by providing streamlined and seamless service in this area. For example, consumers expect secure, transparent, and seamless payment options at a plurality of charging points. Suppliers will be expected to provide these services in a way that adequately forecasts the timing, location, and quantity of electricity usage demanded by the consumer. Further, suppliers will need to provide these services while managing costs and expenses and maintaining grid reliability.

Figure 1:
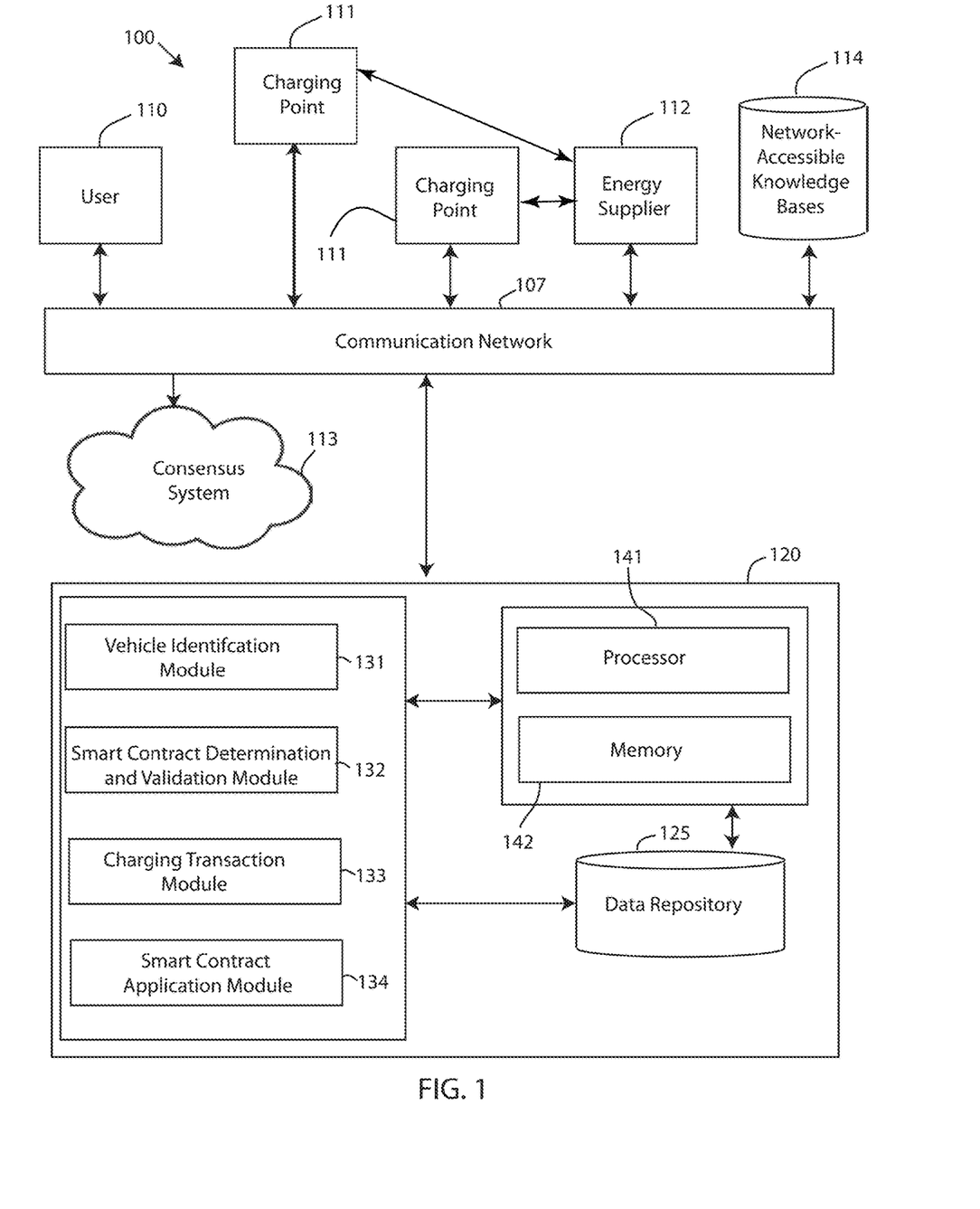
FIG. 1 depicts a block diagram of an electric vehicle electricity contract management system in accordance with embodiments of the present invention.

Referring now to the drawings, FIG. 1 depicts a block diagram of an electric vehicle electricity contract management system 100 in accordance with embodiments of the invention. Embodiments of the electric vehicle electricity contract management system 100 may be described as a system for creating, managing, regulating, and/or applying a contract for supply of energy/electricity to an electric vehicle from a supplier wherein the energy/electricity may be provided at a plurality of different charging points. An embodiment of the electric vehicle electricity contract management system 100 may comprise a plurality of charging points 111 communicatively coupled to a computing device 120 over a communication network 107. The number of charging points 111 connecting to the computing device 120 over the network 107 may vary in different embodiments. The charging points 111 may be locations capable of providing energy/electricity to a customer or consumer.

The electric vehicle electricity contract management system 100 may also comprise an energy supplier 112. Some embodiments may comprise a plurality of energy suppliers such as the energy supplier 112. The energy supplier 112 may be, for example, a company whose business is providing energy/electricity to consumers. Energy supplier 112 may provide energy/electricity to consumers at their home locations, at retail locations, or any other point.

As shown, in some embodiments, the charging points 111 may also be communicatively coupled to the energy supplier 112 directly, in addition to or instead of being communicatively coupled to the energy supplier through the network 107. Further, it will be understood that, in embodiments comprising a plurality of energy suppliers such as energy supplier 112, any respective charging point may be communicatively coupled to only a respective energy supplier, or may be communicatively coupled to a plurality of energy suppliers.

The electric vehicle electricity contract management system 100 may also comprise a user 110. In general, the user 110 may be a customer or consumer of the energy supplier, that is an individual or entity that purchases or consumes energy/electricity. Embodiments of the user 110 may be an electric vehicle. Alternatively, the user 110 may be an individual, group of individuals, or other entity associated with an electric vehicle, for example, the owner or operator of an electric vehicle.

The user 110 may connect to the communication network 107, the computing device 120, and/or the energy supplier 112 for the purposes of creating an agreement for purchasing energy/electricity from the energy supplier 112. The agreement is referred to hereinafter as a smart contract. The smart contract may provide terms and conditions for the transfer of energy/electricity from the energy supplier 112 to the user 110, for example through the charging points 111. The terms and conditions may be negotiated by, and/or agreed to by the energy supplier 112 and the user 110. The terms and conditions may include pricing information, fee schedules, time limits, windows of availability, number of uses, starting balance, payment options, etc.

Hereinafter, the user 110 may be referred to generally as user/electric vehicle 110. Embodiments of the electric vehicle electricity contract management system 100 may comprise a plurality of users/electric vehicles such as the user/electric vehicle 110.

The user/electric vehicle 110 may connect to the charging point 111 to receive an energy/electricity transfer, i.e., to charge the electric vehicle of the user/electric vehicle 110. As will explained in more detail below, energy/electricity may be transferred from the energy supplier 112 to the user/electric vehicle 110 through the charging points 111. The electric vehicle electricity contract management system 100 may authorize, facilitate, monitor, regulate, oversee, govern, or otherwise interact with the transfer of energy/electricity from the energy supplier 112 to the user/electric vehicle 110.

The communication network 107 may refer to a group of two or more computer systems linked together. Communication network 107 may be any type of computer network known by individuals skilled in the art. Examples of computer networks 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the communication network 107 may be a peer-to-peer network in some embodiments, wherein in other embodiments, the network 107 may be organized as a client/server architecture.

In some embodiments, the network 107 may further comprise a connection to one or more network-accessible knowledge bases 114 such as network repository, which are network repositories containing information, network repositories or other systems connected to the network 107 that may be considered nodes of the network 107. In some embodiments, where the computing system 120 or network repositories allocate resources to be used by the other nodes of the network 107, the computing system 120 and network-accessible knowledge bases 114 may be referred to as servers.

The network-accessible knowledge bases 114 may be a data collection area on the network 107 which may back up and save all the data transmitted back and forth between the nodes of the network 107. For example, the network repository may be a data center saving and cataloging information sent between/among the user/electric vehicle 110, the charging points 111, the energy supplier 112, the computing system 120, etc., as well as any combinations thereof. In some embodiments, a data collection center housing the network-accessible knowledge bases 114 may include an analytic module capable of analyzing each piece of data being stored by the network-accessible knowledge bases 114. Further, the computing system 120 may be integrated with or as a part of the data collection center housing the network-accessible knowledge bases 114. In some alternative embodiments, the network-accessible knowledge bases 114 may be a local repository that is connected to the computing system 120.

Further, embodiments of the electric vehicle electricity contract management system 100 may comprise a consensus system 113. In some embodiments, the consensus system 113 may be a publicly distributable transactions ledger or similar record. The consensus system 113 may be decentralized. The consensus system 113 may be referred to as blockchain. Consensus system 113 may allow for unalterable recordation and prevent fraudulent changes as is described in more detail below.

In some embodiments, the smart contract may be stored or maintained by the consensus system 113. In some embodiments, the smart contract may be stored or maintained in other locations such as the network-accessible knowledge bases 114, the computing system 120, the memory 142, the data repository 125, the energy supplier 112, the charging points 111, or other locations connected to the network 107. In some embodiments, the consensus system 113 may access, govern, regulate, maintain, or otherwise interact with the smart contract.

Figure 2:
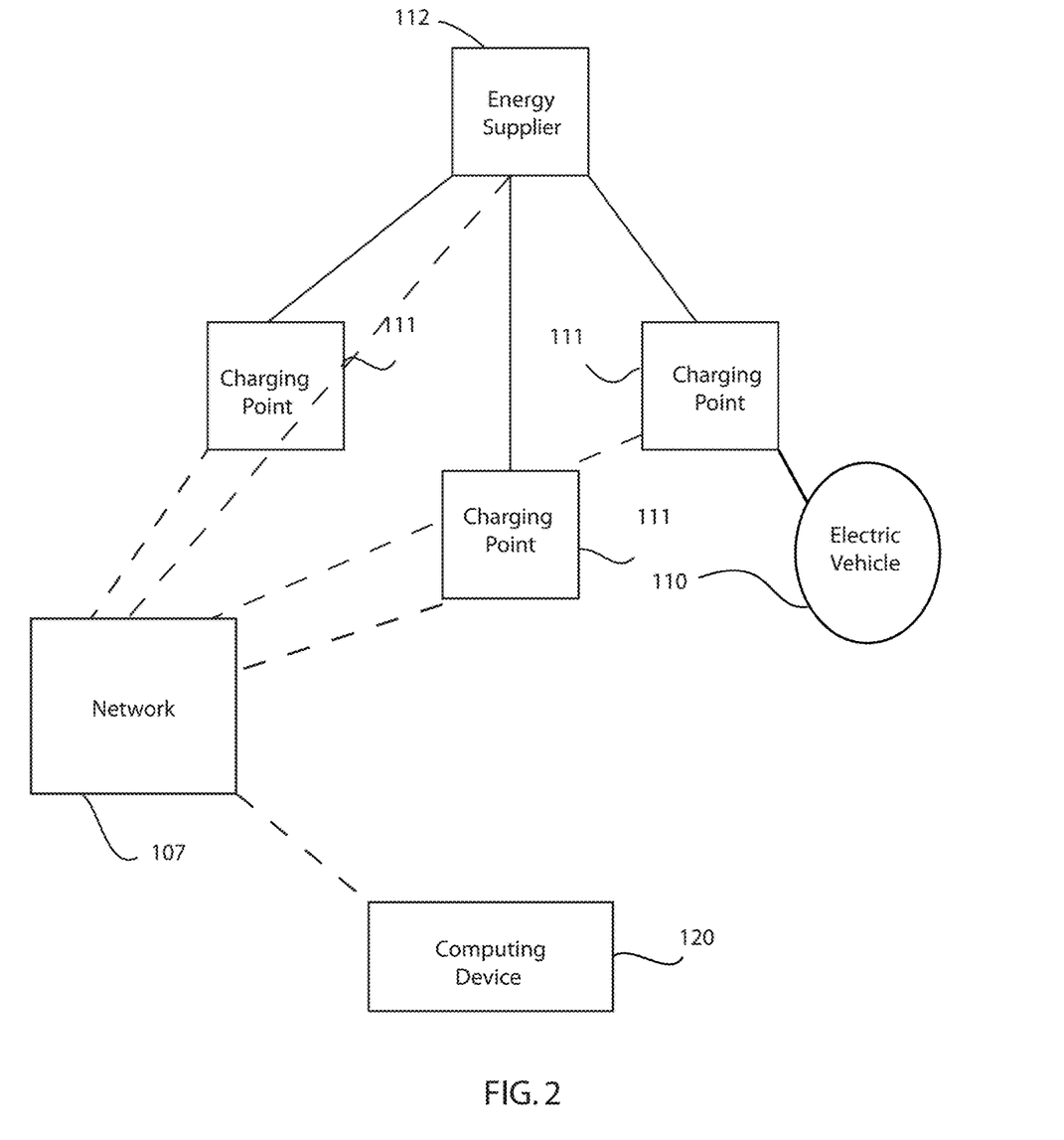
FIG. 2 depicts a block diagram of an electric vehicle electricity contract management system in accordance with further embodiments of the present invention, wherein an electric vehicle is connected to a charging point.

FIG. 2 depicts a block diagram of an electric vehicle electricity contract management system 100 in accordance with further embodiments of the present invention, wherein an electric vehicle is connected to a charging point. In the embodiment shown, the user/electric vehicle 110 is an electric vehicle. The user/electric vehicle 110 is connected to a charging point 111. The charging point 111 is connected to the energy supplier 112 and also to the network 107. The network in turn is connected to computing device 120.

Embodiments of the electric vehicle electricity contract management system 100 such as that shown in FIG. 2 may be used to manage the process of buying and selling energy to charge an electric vehicle. For example, when the user/electric vehicle 110 connects to the charging point 111, the computing device 120 may perform the steps of determining whether the user/electric vehicle 110 is associated with a smart contract (stored or maintained in the consensus system 113 or elsewhere in the electric vehicle electricity contract management system 100). If the smart contract is determined to exist, the computing device 120 may validate the smart contract and create a charging transaction for the user/electric vehicle 110. The computing device may then apply the smart contract associated with the user/electric vehicle 110 against the charging transaction. Applying the smart contract may comprise triggering payment and/or updating the smart contract with the charging transaction and/or the payment. In other words, the computing device 120 may use the consensus system 113 to verify that the user/electric vehicle 110 is linked to a smart contract, authorize a charging transaction, resolve the charging transaction including payment, and update the smart contract.

Referring again to FIG. 1, embodiments of the electric vehicle electricity contract management system 100 are explained in more detail. In some embodiments, the computing device 120 may be a computing system that includes a vehicle identification module 131, a smart contract determination and validation module 132, a charging transaction module 133, and a smart contract application module 134. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory device of the energy metering device 120. A module (whether hardware, software, or a combination thereof) may be designed to implement or execute one or more particular functions or routines. The computing system 120 may also be equipped with a memory device 142 which may store various information and data regarding the user 110, the charging points 111, the energy supplier 112, etc., and a processor 141 for implementing the tasks associated with the electric vehicle electricity contract management system 100.

Embodiments of the vehicle identification module 131 may include one or more components of hardware and/or software program code for identifying the user/electric vehicle 110 when the user/electric vehicle connects to a charging point 111. In some embodiments, the user/electric vehicle 110 may be a smart car or may include a smart device, meaning user/electric vehicle 110 may comprise an electronic device, generally connected or connectable to other devices or networks via different wireless protocols such as Bluetooth, NFC, Wi-Fi, LiFi, 3G, etc. The user/electric vehicle 110 may have an identifier, for example, an identifier in a Public Key Infrastructure (PKI) or similar system, an IP address, a media access control (MAC) address, radio frequency identification (RFID) technology, and electronic product code (EPC), a uniform resource identifier (URI), unique device identification (UDI), and the like. In some embodiments, the identifier may be an identifier that is also used for other purposes, such as a vehicle identification number (VIN), a license plate number, a registration number, a driver's license or other identification, a cell-phone number, an email address, a credit or debit card number, and the like. Further, a combination of these types of identifiers may be used. In some embodiments, the vehicle identification module 131 may receive the identifier from the user/electric vehicle 110, for example through the network 107. In some embodiments, the user/electric vehicle 110 may generally be connected to the network 107 while in operation, thus allowing the vehicle identification module 131 to access the identifier. Alternatively, in some embodiments, the user/electric vehicle 110 may provide the identifier to the vehicle identification module 131 at certain times. For example, the user/electric vehicle 110 may provide the identifier to the vehicle identification module 131 when it connects to a charging point 111. Alternatively, the vehicle identification module 131 may receive the identifier from the charging point 111, for example, when the user/electric vehicle 110 connects to the charging point 111.

In some embodiments, the vehicle identification module 131 may use the identifier to identify the user/electric vehicle 110. For example, the vehicle identification module 131 may use the identifier to identify the user/electric vehicle 110 as a user/electric vehicle 110 for which information is stored in one or more of the network-accessible knowledge bases 114, the consensus system 113, or elsewhere in the computing device 120 such as in the memory 142 or the data repository 125. Alternatively, the receipt of the identifier may itself comprise identification of the user/electric vehicle 110, without the use of further information.

Embodiments of the smart contract determination and validation module 132 may include one or more components of hardware and/or software program code for determining whether the identified user/electric vehicle 110 is associated with a smart contract and/or validating the smart contract if it is determined to exist. As described above, the smart contract may be an agreement between the user/electric vehicle 110 and the energy supplier 112 regarding the purchase or exchange of energy/electricity. The smart contract may include the terms and conditions of the purchase/exchange, for example, pricing, other fees, applicable locations and times number of uses, etc.

In some embodiments, the smart contract determination and validation module 132 may receive the identifier from the vehicle identification module 131 or may receive information from the vehicle identification module 131 that a vehicle has been identified. The smart contract determination and validation module 132 may then determine whether the identified user/electric vehicle 110 is associated with a smart contract. As an example, the smart contract determination and validation module 132 may search, mine, or otherwise interact with the consensus system 113 to determine if the user/electric vehicle 110 is associated with a smart contract. Similarly, in some embodiments, the smart contract determination and validation module 132 may search, mine, or otherwise interact with other storage locations such as the energy supplier 112, the charging point 111, the computing system 120, the memory 142, the data repository 125, and the like, to determine if the user/electric vehicle 110 is associated with a smart contract. If the user/electric vehicle 110 is associated with a smart contract, the smart contract determination and validation module 132 may validate the smart contract. In some embodiments, validating the smart contract may include evaluating the smart contract to ensure it is in effect at the time of connection to the particular charging point 111, evaluating the smart contract to ensure it is in effect at the particular charging point 111 or at a location associated with the charging point 111, and the like. In embodiments in which the user 110 may be associated with different electric vehicles, validating the smart contract may include evaluating the smart contract to ensure the smart contract applies to the particular electric vehicle connected to the particular charging point 111.

In some embodiments, validating the smart contract may include evaluating the history of the smart contract to ensure the smart contract has not been tampered with or altered. For example, the smart contract determination and validation module 132 may validate the smart contract using the consensus system 113, for example, by reviewing prior blocks of the block chain to ensure the smart contract is current and accurate.

Embodiments of the charging transaction module 133 may include one or more components of hardware and/or software program code for creating a charging transaction. In some embodiments, the charging transaction may be created after the user/electric vehicle 110 connects to the charging point 111, is identified, and after the smart contract is determined and validated. In some embodiments, the charging transaction may be or may include a transfer of energy/electricity—for example, the user/electric vehicle 110 may receive energy/electricity from the charging point 111. The charging transaction may include details regarding the type, quality, or amount of energy/electricity exchanged, along with other information.

Embodiments of the smart contract application module 134 may include one or more components of hardware and/or software program code for applying the smart contract against the charging transaction. In some embodiments, applying the smart contract against the charging transaction may include applying the terms and conditions of the smart contract to the charging transaction. For example, if the smart contract sets a price of $0.12 per kilowatt-hour (kWh) and 20 kWh are transferred to the electric vehicle during the charging transaction, the price for the charging transaction would be $2.40. Applying the smart contract against the charging transaction may include determining the cost of $2.40 under the contract. Applying the smart contract may also include applying other terms and conditions. For example, the smart contract may include other fees or pricing options, for example, an additional fee for using a charging point 111 in a premium location, an additional fee for peak usage times, special discounts or promotions, etc. Further, applying the smart contact may comprising applying terms and conditions such as payment, billing, reporting, or billing options and the like.

In some embodiments, applying the smart contract may comprise triggering payment. Payment may be made according to the terms and conditions of the smart contract. For example, the terms and conditions may be applied to the charging transaction to determine what price should be paid, what discounts or promotions should be applied, etc. Further, applying the smart contract against the charging transaction may include using a specific means of payment. For example, the smart contract terms and conditions may require payment from a bank account, payment by a specific credit or debit card, deduction from a prepaid account, and the like. The terms and conditions may also include multiple options for payment along with criteria for selecting between the multiple options.

Still further, in some embodiments, applying the smart contract may include updating the smart contract. For example, the smart contract may be updated to reflect that the charging transaction has taken place. In embodiments in which the smart contract includes a number of uses provided to the user/electric vehicle 110, updating the smart contract may comprise deducting a use from the number of uses. In embodiments in which the smart contract includes a balance for the user/electric vehicle 110, updating the smart contract may comprise updating the balance after deducting the amount of the charging transaction. Further means of updating the smart contract may be used as would be appropriate for the terms and conditions of the smart contract.

Still further, in some embodiments applying the smart contract may include updating or notifying the user 110 and/or the energy supplier 112. For example, the user 110 and/or the energy supplier 112 may be provided with a notice that the charging transaction has occurred, a statement or invoice regarding the charging transaction and the payment, and other details.

Applying the smart contract and/or updating of the smart contract may occur by or within the consensus system 113. Use of the consensus system 113 allows for secure and reliable updating of the smart contract. For example, in embodiments in which the consensus system 113 makes use of blockchain technology, the smart contract may be updated with a new block representing the charging transaction and/or the application of the smart contract against the charging transaction.

Figure 3:
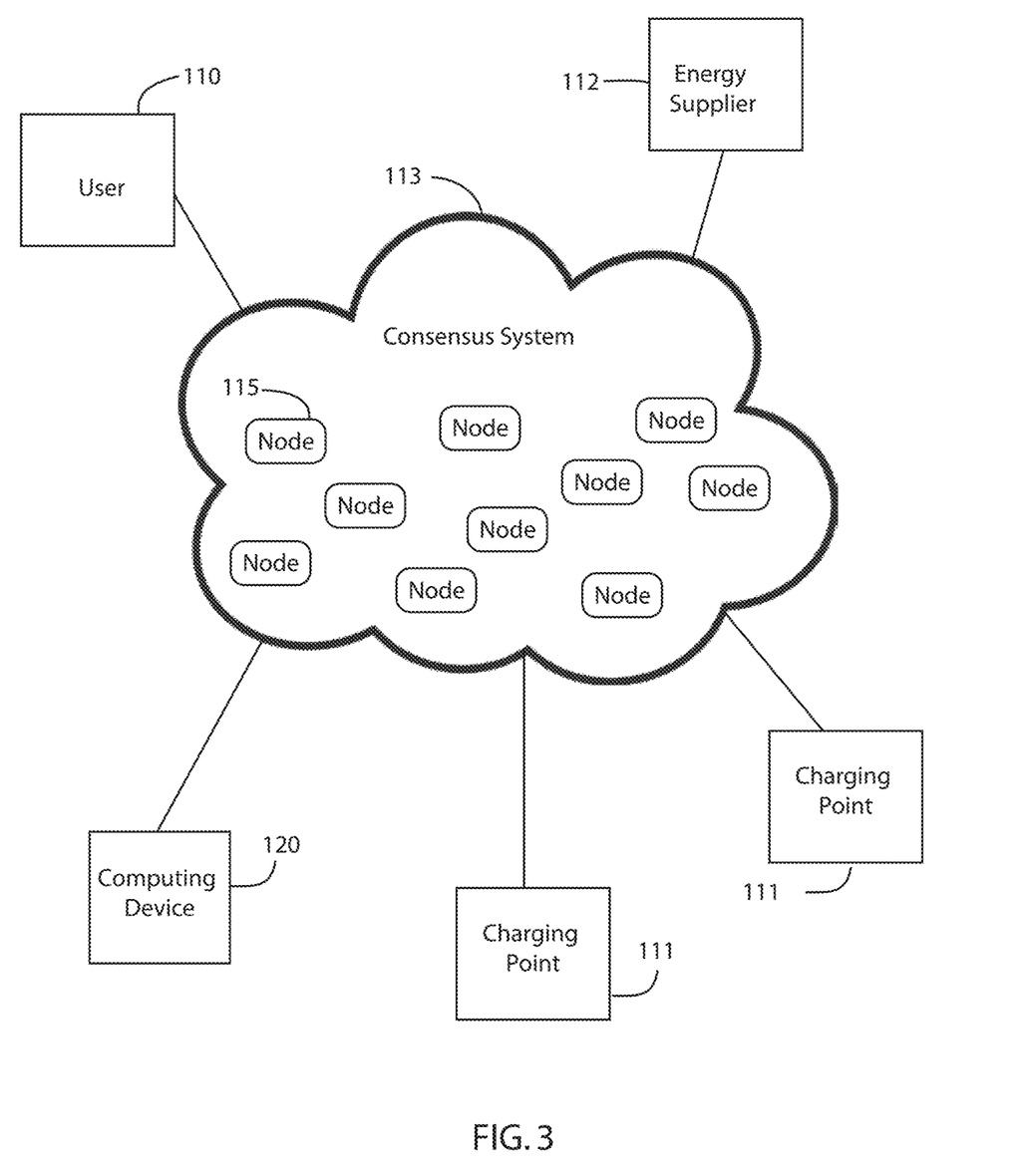
FIG. 3 depicts a block diagram of a consensus system, in accordance with embodiments of the present invention.

FIG. 3 depicts a block diagram of a consensus system, in accordance with embodiments of the present invention. Embodiments of the consensus system 113 may be a distributed peer-to-peer network, including a plurality of nodes 115. The consensus system 113 may represent a computing environment for operating a decentralized framework that can maintain a distributed data structure. In other words, consensus system 113 may be a secure distributed transaction ledger or a blockchain. The consensus system 113 may support cryptocurrency. Each node 115 may maintain an individual public ledger or account (i.e. maintained publicly) according to set procedures that employ cryptographic methods and a proof-of-work concept. In view of the public nature of the ledger or account and the proof-of-work concept, the nodes 115 collectively create a decentralized, trusted network. Further, embodiments of the consensus system 113 may be accessible by the computing device, the user 110, the charging points 111, and the energy provider system 112, for identifying a user 110, accessing and/or validating a smart contract, creating a charging transaction, and applying the smart contract against the charging transaction. Further, the consensus system 113 may also be used for triggering payment or providing payment, updating the smart contract with the charging transaction and/or the payment, updating the user 110 and/or the energy supplier 112 regarding the transaction or payment, etc.

Figure 4:
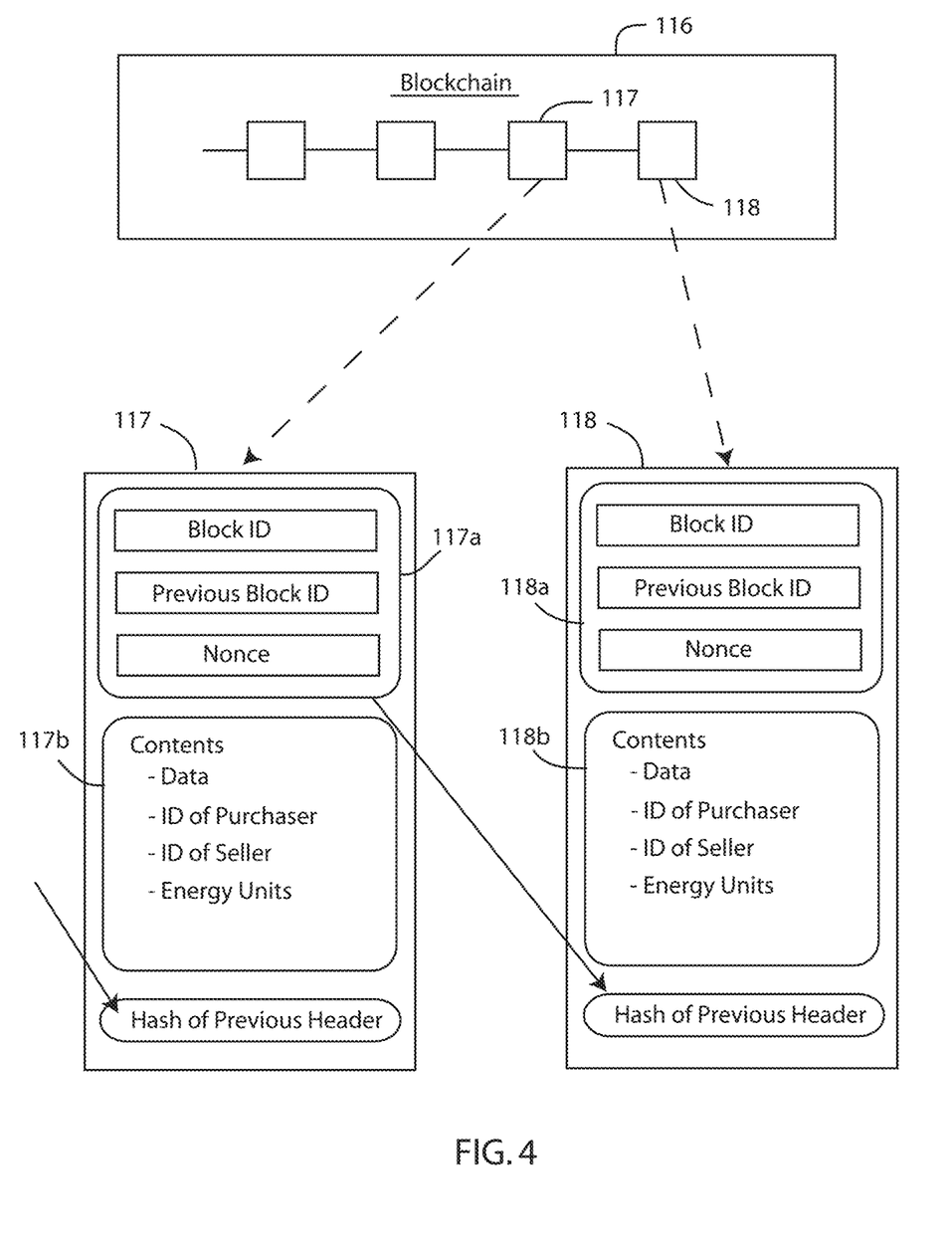
FIG. 4 depicts a blockchain and two exemplary blocks of the blockchain, in accordance with embodiments of the present invention.

FIG. 4 depicts a blockchain 116 and two exemplary blocks 117, 118 of the blockchain 116, in accordance with embodiments of the invention. Embodiments of the blockchain 116 may represent the consensus system 113, and may include a plurality of blocks. Each block, such as block 117 and block 118 may include data regarding recent transactions and/or contents relating to the smart contract and any associated charging transactions, linking data that links one block 118 to a previous block 117 in the blockchain, proof-of-work data that ensures that the state of the blockchain 116 is valid, and is endorsed/verified by a majority of the consensus system. The confirmed transactions of the blockchain may be done using cryptography to ensure that the integrity and the chronological order of the blockchain are enforced and can be independently verified by each node 115 of the blockchain 116. New transactions may be added to the blockchain 116 using a distributed consensus process that confirms pending transactions using a mining process, which means that each transaction can easily be verified for accuracy, but very difficult or impossible to modify. Moreover, embodiments of a block 117 of the blockchain 116 may include a header 117a and a content 117b. Embodiments of the header 117a may include a block ID, a previous block ID, and a nonce. The nonce may represent a proof-of-work. The header 117a may be used to link block 117 to other blocks of the blockchain. Embodiments of the block contents 117b may include charging transaction information relating to a transaction for energy/electricity. Likewise, block 118 may include a header 118a and contents 118b. Block 118 includes a hash of the previous block's header (i.e. 117a), thereby linking the blocks 117, 118 to the blockchain.

The charging transaction information cannot be modified without at least one of the nodes 115 noticing; thus, the blockchain 116 can be trusted to verify transactions occurring between the user 110 and the energy supplier 112 through the charging points 111.

Various tasks and specific functions of the modules of the computing system 120 may be performed by additional modules, or may be combined into other module(s) to reduce the number of modules. Further, embodiments of the computer or computer system 120 may comprise specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry may include proprietary specially designed components (e.g., a specialized integrated circuit, such as for example an Application Specific Integrated Circuit (ASIC), designed for only implementing methods of the present invention).

Embodiments of the electric vehicle electricity contract management system 100 improves the speed, reliability, and security of an energy/electricity transfer, particularly when multiple transfers occur at a plurality of different charging points. Embodiments of the electric vehicle electricity contract management system 100 also improve consumer options for energy/electricity. Further, embodiments of the electric vehicle electricity contract management system 100 increase the energy supplier's ability to meet demand that may vary by location, timing, quantity, quality, etc. The electric vehicle electricity contract management system provides a technical solution by allowing myriad energy/electricity transfers to be offered and fulfilled by creating the charging transaction having specific details and intelligently applying and applying the smart contract to the charging transaction as described above. Embodiments of the present invention further overcomes technical limitations present in every computing system. The technical solution(s) described herein is necessarily rooted in computer technology in order to overcome a problem specifically arising in the realm of energy/electricity transfers, particularly transfers that must be able to occur at a plurality of locations. For instance, instead of a user needing to recharge an electric vehicle at one specific location (home, work, etc.) the user may make use of any of the plurality of charging stations. Similarly, instead of needing to check prices, rates, quality, etc. at varying locations, any recharging may be intelligently governed by the application of the smart contract. Still further, the consensus system may provide increased security and dependability in comparison to other payment methods, account management methods, and the like.

Figure 5:
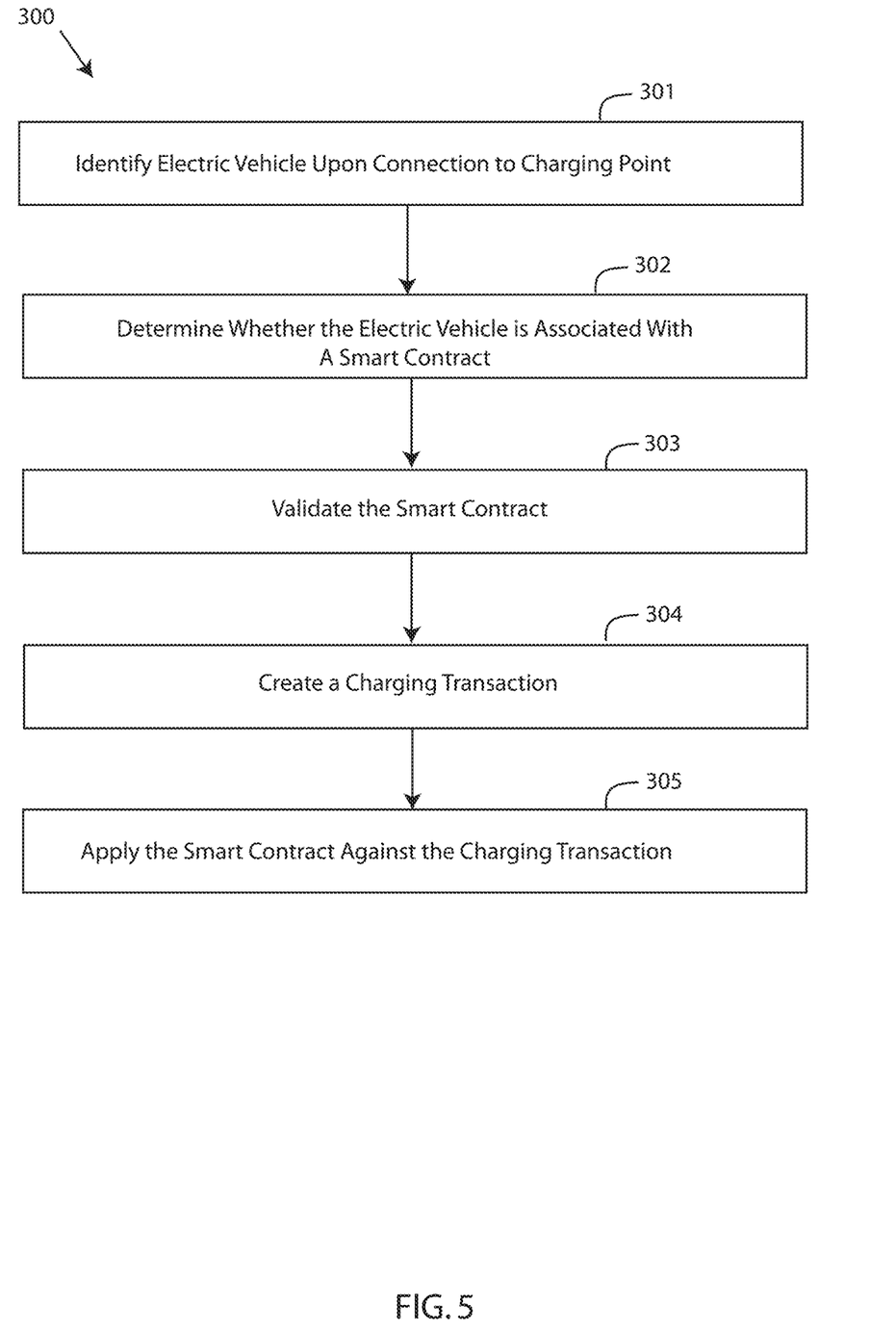
FIG. 5 depicts a flow chart of a method for managing an electric vehicle electricity contract, in accordance with embodiments of the present invention.

FIG. 5 depicts a flow chart of a method for managing an electric vehicle electricity contract, in accordance with embodiments of the present invention. One embodiment of a method 300 or algorithm that may be implemented for managing an electricity contract for an electric vehicle in accordance with the electric vehicle electricity contract management system 100 is described in FIG. 1 using one or more computer systems as defined generically in FIG. 7 below, and more specifically by the specific embodiments of FIGS. 1-4.

Embodiments of the method 300 for managing an electric vehicle electricity contract may begin at step 301 wherein an electric vehicle is identified upon connection to a charging point. Step 302 determines whether the electric vehicle is associated with a smart contract. This may be accomplished by mining or otherwise reviewing a consensus system such as consensus system 113. Step 303 validates the smart contract. This may also be accomplished using the consensus system 113. Step 304 creates a charging transaction. The charging transaction may charge the electric vehicle and may include details of units of energy provided or transferred to the electric vehicle and other information. Step 305 applies the smart contract against the charging transaction. Applying the smart contract against the charging transaction may include, for example, applying the terms and conditions agreed upon in the smart contract to the factual details of the charging transaction. For example, if the smart contract sets a price of $0.12 per kilowatt-hour (kWh) and 20 kWh are transferred to the electric vehicle during the charging transaction, the price for the charging transaction would be $2.40. Applying the smart contract against the charging transaction may include determining the cost of the charging transaction, triggering payment according to the determined cost, and/or updating an account or ledger with the charging transaction and/or payment. These steps may be taken by the computing device 120 using the consensus system 113 as described above.

Figure 6:
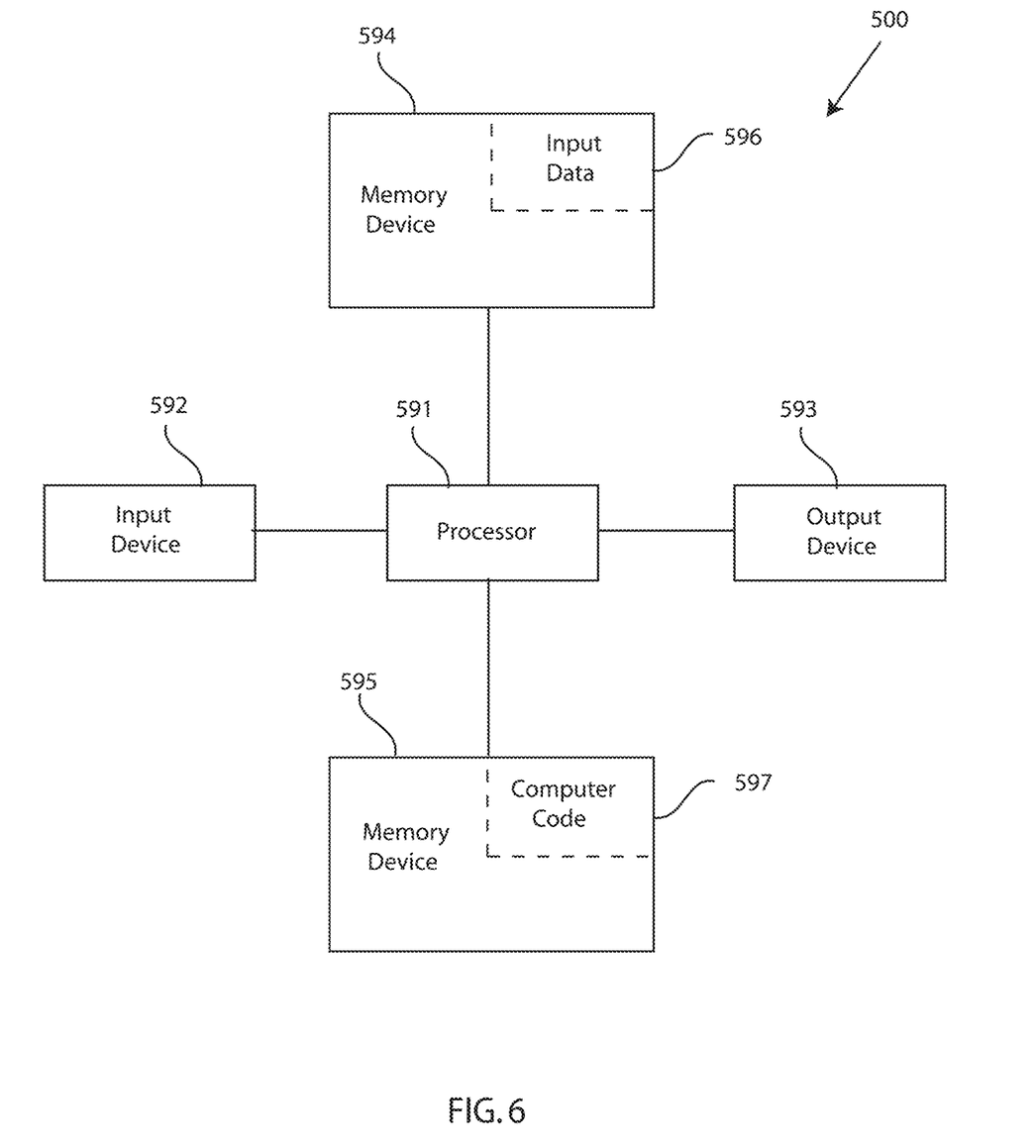
FIG. 6 depicts a block diagram of a computer system for the electric vehicle electricity contract management system of FIGS. 1-4, capable of implementing the method for managing an electric vehicle electricity contract of FIG. 5, in accordance with embodiments of the present invention.

FIG. 6 depicts a block diagram of a computer system for the electric vehicle electricity contract management system 100 of FIGS. 1-4, capable of implementing methods for managing an electric vehicle electricity contract of FIG. 5, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for managing an electric vehicle electricity contract in the manner prescribed by the embodiments of FIG. 5 using the electric vehicle electricity management system 100 of FIGS. 1-4, wherein the instructions of the computer code 597 may be executed by processor 591 via memory device 595. The computer code 597 may include software or program instructions that may implement one or more algorithms for implementing the method for managing an electric vehicle electricity contract, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are applied. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 6.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to electric vehicle electricity contract management systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to manage electric vehicle electricity contracts. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for managing an electric vehicle electricity contract. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for managing an electric vehicle electricity contract.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
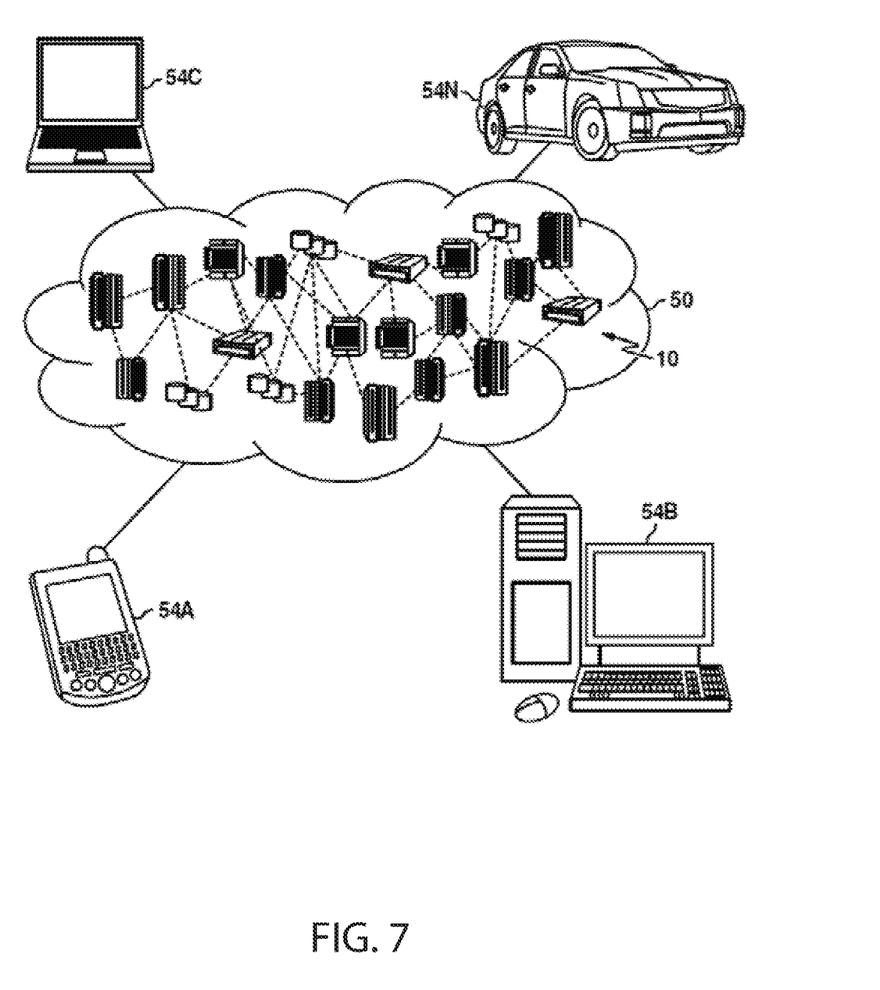
FIG. 7 depicts a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 8:
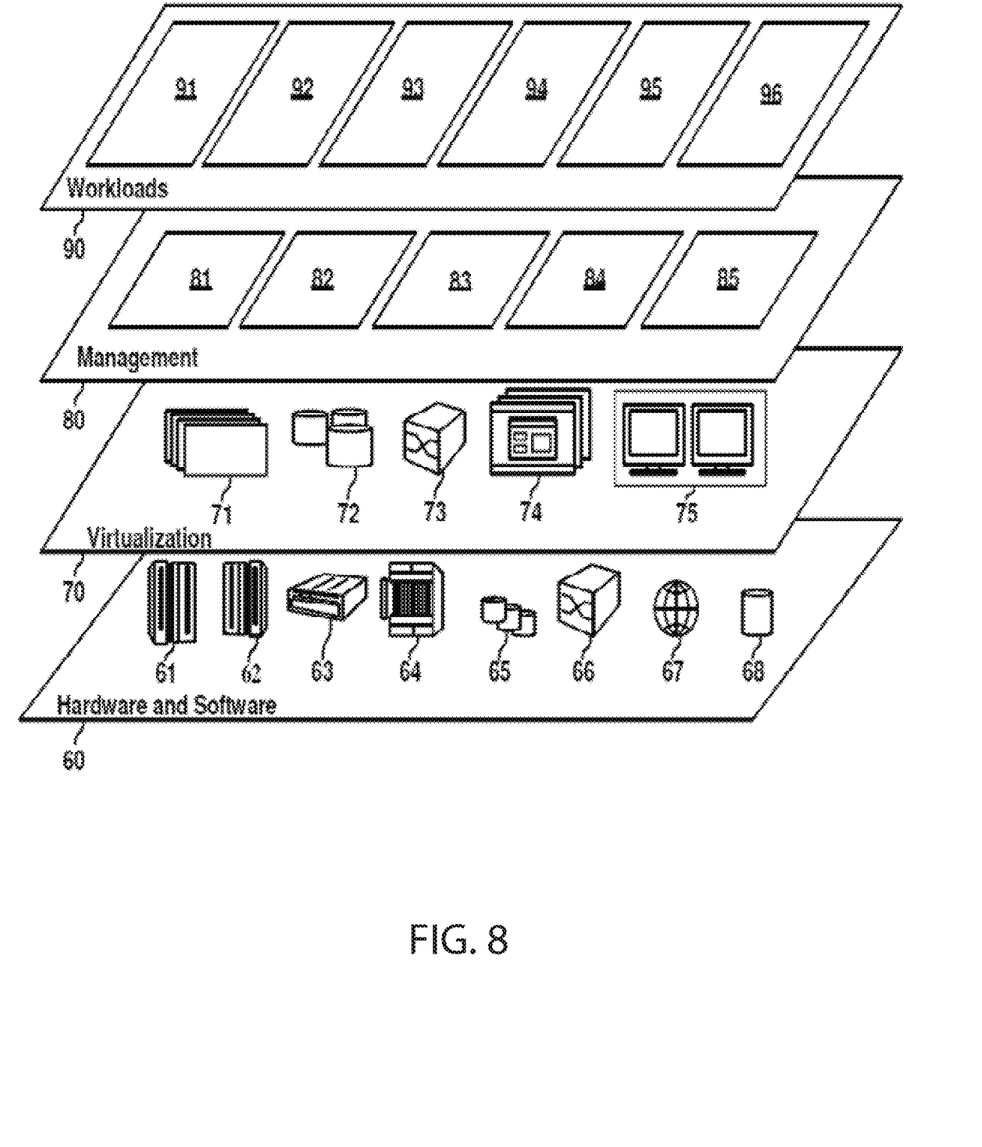
FIG. 8 depicts abstraction model layers, in accordance with embodiments of the present invention.

Referring now to FIG. 8, a set of functional abstraction layers provided by cloud computing environment 50 (see FIG. 7) are shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and electric vehicle electricity contract management 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for charging an electric vehicle, the method comprising:
    identifying, by a processor, an electric vehicle, when the electric vehicle connects to a charging point;
    determining, by the processor, whether the electric vehicle is associated with a smart contract stored on a decentralized consensus system;
    validating, by the processor, the smart contract associated with the electric vehicle, the validating including evaluating a history of the smart contract to ensure the smart contract has not been tampered with or altered by reviewing prior blocks of a block chain forming the decentralized consensus system;
    creating, by the processor, a charging transaction wherein the electric vehicle is charged; and
    applying, by the processor, the smart contract associated with the electric vehicle against the charging transaction.

2. The method of claim 1, wherein the smart contract comprises charging transaction terms and conditions agreed to by an electricity supplier offering electricity at the charging point and a user of the electric vehicle.

3. The method of claim 2, wherein applying the smart contract associated with the electric vehicle comprises applying the charging transaction terms and conditions to the charging transaction.

4. The method of claim 1, wherein applying the smart contract associated with the electric vehicle comprises triggering payment for the charging transaction.

5. The method of claim 4, wherein applying the smart contract associated with the electric vehicle further comprises updating a ledger with the charging transaction and the payment.

6. The method of claim 5, wherein the ledger is maintained by a consensus system.

7. The method of claim 6, wherein the consensus system updates an electricity supplier and a user of the electric vehicle.

8. The method of claim 1, wherein determining whether the electric vehicle is associated with a smart contract is accomplished using a proof of work scheme.

9. A computing system, comprising:
   a processor;
   a memory device coupled to the processor; and
   a computer readable storage device coupled to the processor, wherein the storage device contains program code executable by the processor via the memory device to implement a method for charging an electric vehicle, the method comprising:
      identifying, by a processor, an electric vehicle, when the electric vehicle connects to a charging point;
      determining, by the processor, whether the electric vehicle is associated with a smart contract stored on a decentralized consensus system;
      validating, by the processor, the smart contract associated with the electric vehicle, the validating including evaluating a history of the smart contract to ensure the smart contract has not been tampered with or altered by reviewing prior blocks of a block chain forming the decentralized consensus system;
      creating, by the processor, a charging transaction wherein the electric vehicle is charged; and
      applying, by the processor, the smart contract associated with the electric vehicle against the charging transaction.

10. The computing system of claim 9, wherein the smart contract comprises charging transaction terms and conditions agreed to by an electricity supplier offering electricity at the charging point and a user of the electric vehicle.

11. The computing system of claim 9, wherein applying the smart contract associated with the electric vehicle comprises applying the charging transaction terms and conditions to the charging transaction.

12. The computing system of claim 9, wherein applying the smart contract associated with the electric vehicle comprises triggering payment for the charging transaction.

13. The computing system of claim 12, wherein applying the smart contract associated with the electric vehicle further comprises updating a ledger with the charging transaction and the payment.

14. The computing system of claim 13, wherein the ledger is maintained by a consensus system.

15. The computing system of claim 14, wherein the consensus system updates an electricity supplier and a user of the electric vehicle.

16. The computing system of claim 9, wherein determining whether the electric vehicle is associated with a smart contract is accomplished using a proof of work scheme.

17. A computer program product, comprising a computer readable hardware storage device storing a computer readable program code, the computer readable program code comprising an algorithm that when executed by a computer processor of a computing system implements a method for charging an electric vehicle, the method comprising:
   identifying, by a processor, an electric vehicle, when the electric vehicle connects to a charging point;
   determining, by the processor, whether the electric vehicle is associated with a smart contract stored on a decentralized consensus system;
   validating, by the processor, the smart contract associated with the electric vehicle, the validating including evaluating a history of the smart contract to ensure the smart contract has not been tampered with or altered by reviewing prior blocks of a block chain forming the decentralized consensus system;
   creating, by the processor, a charging transaction wherein the electric vehicle is charged; and
   applying, by the processor, the smart contract associated with the electric vehicle against the charging transaction.

18. The computer program product of claim 17, wherein the smart contract comprises charging transaction terms and conditions agreed to by an electricity supplier offering electricity at the charging point and a user of the electric vehicle.

19. The computer program product of claim 17, wherein applying the smart contract associated with the electric vehicle comprises applying the charging transaction terms and conditions to the charging transaction.

20. The computer program product of claim 17, wherein applying the smart contract associated with the electric vehicle comprises triggering payment for the charging transaction.

* * * * *